(12) United States Patent
Barkowsky (10) Patent No.: US 9,211,954 B2
(45) Date of Patent: Dec. 15, 2015

(54) AIR SUPPLY SYSTEM OF AN AIRCRAFT AND METHOD FOR MIXING TWO AIR STREAMS IN AN AIR SUPPLY SYSTEM

(75) Inventor: Jan Barkowsky, Schwerin (DE)

(73) Assignee: Airbus Operations GmbH (DE)

( * ) Notice: Subject to any disclaimer, the term of this patent is extended or adjusted under 35 U.S.C. 154(b) by 1574 days.

(21) Appl. No.: 12/440,701

(22) PCT Filed: Aug. 31, 2007

(86) PCT No.: PCT/EP2007/007636
§ 371 (c)(1),
(2), (4) Date: Aug. 31, 2009

(87) PCT Pub. No.: WO2008/031510
PCT Pub. Date: Mar. 20, 2008

(65) Prior Publication Data
US 2011/0151762 A1 Jun. 23, 2011

Related U.S. Application Data

(60) Provisional application No. 60/825,150, filed on Sep. 11, 2006.

(30) Foreign Application Priority Data

Sep. 11, 2006 (DE) .......................... 10 2006 042 584

(51) Int. Cl.
B64D 13/06 (2006.01)

(52) U.S. Cl.
CPC .......... *B64D 13/06* (2013.01); *B64D 2013/064* (2013.01); *B64D 2013/0618* (2013.01);
(Continued)

(58) Field of Classification Search
CPC ........................ B64D 13/00; B64D 2013/0688
USPC ..................... 454/71, 72, 76; 62/61
See application file for complete search history.

(56) References Cited

U.S. PATENT DOCUMENTS 2,491,461 A 12/1949 Wood
4,209,993 A * 7/1980 Rannenberg ...................... 62/80
(Continued)

FOREIGN PATENT DOCUMENTS

DE 2907826 A1 9/1979
DE 10301465 A1 8/2004
(Continued)

OTHER PUBLICATIONS

Russian Decision to Grant relating to Russian Patent Application No. 2009110181/11(013816), dated Apr. 4, 2011, 4 pages.
(Continued)

*Primary Examiner* — Alissa Tompkins
*Assistant Examiner* — Brittany Towns
(74) *Attorney, Agent, or Firm* — Barnes & Thornburg LLP (57) ABSTRACT

The invention relates to an air supply system of an aircraft, in particular of a passenger aircraft, which comprises a fresh air system, through which fresh air can be supplied to an aircraft cabin, a circulating air system, which is coupled to the fresh air system and through which used cabin air can be supplied to the fresh air system, a cooling air system for cooling an air conditioning system of the aircraft disposed in the fresh air system, and a ventilation system coupled to the cooling air system for ventilating an installation space of the air conditioning system. The air supply system includes a device for fluidically coupling the cooling air system and the ventilation system. The device is disposed and configured inside the fuselage of the aircraft such that the air in one system can be driven through the air flow in the other system. The invention also relates to a method for mixing two air streams in an air supply system of this kind of an aircraft.

18 Claims, 4 Drawing Sheets

(52) U.S. Cl.
CPC . *B64D2013/0648* (2013.01); *B64D 2013/0688* (2013.01); *Y02T 50/44* (2013.01); *Y02T 50/56* (2013.01)

(56) References Cited

U.S. PATENT DOCUMENTS

| | | | | |
|---|---|---|---|---|
| 4,765,131 | A | * | 8/1988 | Benson .......................... 60/782 |
| 4,840,036 | A | | 6/1989 | Spraker, Jr. |
| 5,461,882 | A | * | 10/1995 | Zywiak .......................... 62/401 |
| 5,642,729 | A | * | 7/1997 | Cassidy .................. 128/204.29 |
| 6,401,473 | B1 | * | 6/2002 | Ng et al. ......................... 62/239 |
| 6,415,621 | B2 | * | 7/2002 | Buchholz et al. ............... 62/402 |
| 6,928,827 | B2 | * | 8/2005 | Zaple et al. ..................... 62/170 |
| 2002/0162345 | A1 | * | 11/2002 | Laugt ............................. 62/239 |
| 2008/0087039 | A1 | * | 4/2008 | Reed et al. ..................... 62/498 |

FOREIGN PATENT DOCUMENTS

| | | | |
|---|---|---|---|
| DE | 102007052818 | A1 * | 5/2009 |
| EP | 0968918 | A2 | 1/2000 |
| EP | 1247739 | A1 | 10/2002 |
| EP | 1695910 | A2 | 8/2006 |
| JP | 2003205899 | A | 7/2003 |
| JP | 2004066923 | A | 3/2004 |
| RU | 2111152 | C1 | 5/1998 |

OTHER PUBLICATIONS

PCT International Search Report for PCT/EP2007/007636 completed by the EP Searching Authority on Nov. 12, 2007.
English Summary of Japanese Office Action for Japanese Patent Application No. 2009-527040 dated Oct. 2, 2012 issued on parallel Patent Application.

* cited by examiner

AIR SUPPLY SYSTEM OF AN AIRCRAFT AND METHOD FOR MIXING TWO AIR STREAMS IN AN AIR SUPPLY SYSTEM

CROSS-REFERENCE TO RELATED APPLICATIONS

This application is a U.S. national counterpart application of international application serial No. PCT/EP2007/007636 filed Aug. 31, 2007, which claims priority to German Patent Application No. 102006042584.7 filed Sep. 11, 2006 and to U.S. Provisional Patent Application No. 60/825,150 filed Sep. 11, 2006.

FIELD OF THE INVENTION

The present invention relates to an air supply system of an aircraft, in particular of a passenger aircraft, which comprises a fresh air system, through which fresh air can be supplied to an aircraft cabin, a circulating air system, which is coupled to the fresh air system and through which used cabin air can be supplied to the fresh air system, a cooling air system for cooling an air conditioning system of the aircraft disposed in the fresh air system, and a ventilation system coupled to the cooling air system for ventilating an installation space of the air conditioning system. The invention also relates to a method for mixing two air streams in an air supply system of this kind.

BACKGROUND OF THE INVENTION

Air supply systems on board a passenger aircraft have in recent years become increasingly more complex, as different climate zones in the aircraft cabin must be supplied with fresh air in order to make the flight as pleasant as possible for the passengers. The cabin air must also be treated at continuous intervals. For this purpose the used cabin air is removed from the cabin, mixed with fresh air and supplied to the cabin again. Furthermore, certain components which are installed on board, such as, e.g. the air conditioning system, must be supplied with cooling air. The installation space of the air conditioning system must be ventilated in order to remove any escaping fuel and/or oil vapours and to exclude potential fires.

For this reason concepts which provide solutions for the fresh air supply, circulating air circulation, cooling air supply and ventilation of the installation space of the air conditioning system have been developed in recent years. These solutions are described below with reference to FIG. 1 to FIG. 5. In this respect only the principles which form the basis of the individual solutions are described, without entering into technical detail.

A) Fresh Air System

Figure 1:
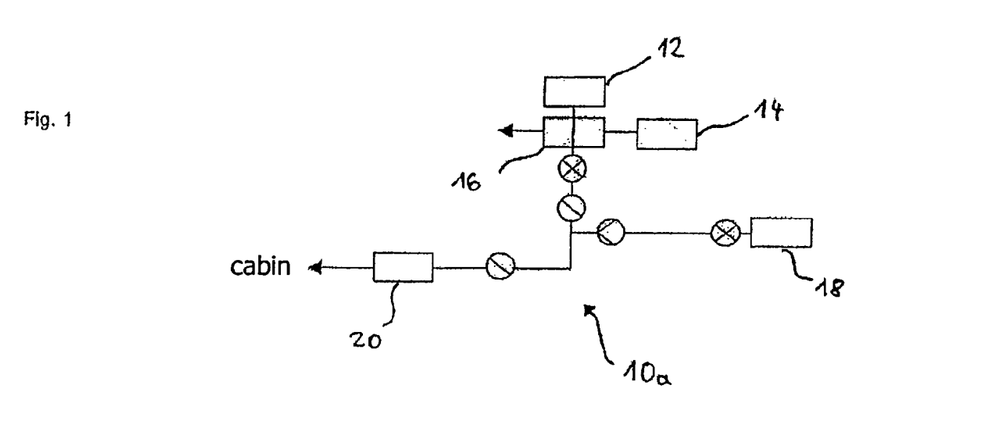
FIG. 1 represents a first variant of a conventional fresh air system in which fresh air is withdrawn during flight from the primary circuit of a turbine engine and during ground operation from the auxiliary turbine of the aircraft.

FIG. 1 shows a conventional solution 10a for the fresh air ventilation of the aircraft cabin. For this purpose the fresh air is obtained during flight as bleed air from the primary circuit 12 (high- and intermediate-pressure compressor) of the main turbine engines and on the ground from the auxiliary turbine 18. On account of the high temperature level, the bleed air from the primary circuit 12 of the main turbine engines must be precooled. This precooling takes place through bleed air from the secondary circuit 14 of the main turbine engines which flows through a heat exchanger 16 and as a result pre-cools the bleed air obtained from the primary circuit 12 of the main turbine engines. The air conditioning system 20 of the aircraft is in addition driven by the flow energy of the bleed air from the primary circuit 12 of the main turbine engines.

In the conventional fresh air system which is shown in FIG. 1 the withdrawal of bleed air from the primary circuit of the main turbine engines leads to a power loss and to increased kerosene consumption by the main turbine engines. Furthermore, an increased construction expenditure is required on account of the high temperature and pressure level at the bleed air off-takes and temperature monitoring in order to protect surrounding structures. It is also necessary to control the volumetric flow rate and the pressure of the withdrawn bleed air through appropriate valves. This leads to further possibilities for failure of the electromagnetically controlled valves, which must be compensated by redundancies, which in turn increases the construction expenditure. Moreover, the fresh air may be contaminated through the escape of oil at the turbine engines and the auxiliary turbine.

Figure 2:
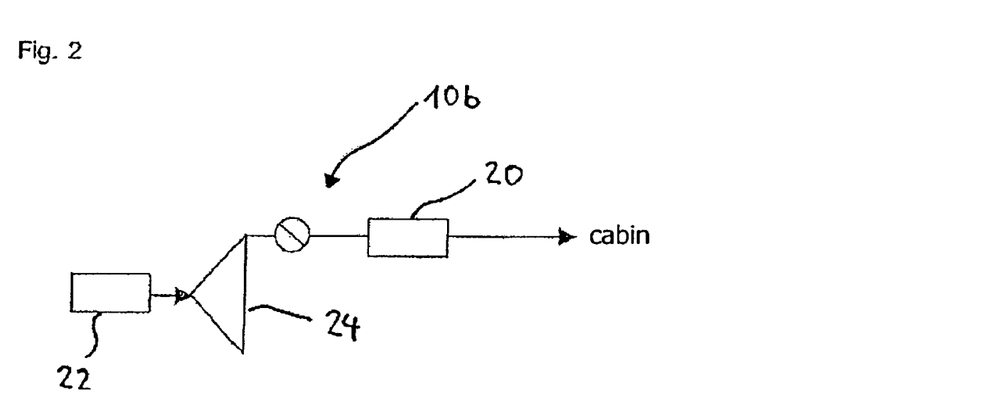
FIG. 2 represents a second variant of a conventional fresh air system in which fresh air is supplied through a ram air inlet to the fresh air system.

A more recent concept 10b for the fresh air supply which is provided for future aircraft projects is represented in FIG. 2. According to this concept 10b, which is not yet in use, fresh air is supplied from outside of the fuselage through a separate ram air inlet opening 22. The ram air entering the ram air inlet opening 22 is compressed by means of an electrically driven compressor 24 in order thus to provide the flow energy for operating the air conditioning system 20. The drive energy for the compressor is provided during flight by the generators of the main turbine engines and on the ground by the auxiliary turbine. This concept does not include the withdrawal of bleed air from the primary circuit of the main turbine engines and the auxiliary turbine.

The fresh air supply without bleed air which is represented in FIG. 2 requires the provision of a homogeneous inflow, which means that a complex intake duct geometry at the ram air inlet 22 is necessary. In addition, the ram air inlet 22 increases the drag coefficient of the aircraft. The complexity and therefore the susceptibility to failure of the system are increased by the controlled actuators for opening and/or closing the inlet flaps at the ram air inlet 22. When the aircraft is de-iced on the ground there is also the risk of de-icing fluid passing from the fuselage into the ram air inlet duct 22 and the fresh air being contaminated as a result.

B) Circulating Air System

Figure 3:
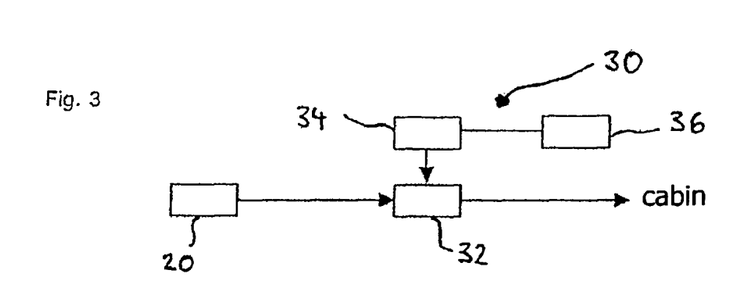
FIG. 3 represents a conventional circulating air system.

With regard to recirculation of the circulating air and its feed into the fresh air system of the aircraft, according to current system concepts 30, as represented in FIG. 3, the re-circulated circulating air 36 is fed into the fresh air system downstream of the air conditioning system 20. The feed and mixing of the re-circulated circulating air 36 with the fresh air delivered by the air conditioning system takes place in a mixing chamber 32. The fresh air mixed with the circulating air is routed from the mixing chamber 32 into the aircraft cabin. The flow energy for the circulating air ventilation is provided by electric blowers 34.

In terms of its construction as a rotating mechanical element, the circulating air blower 34 shown in FIG. 3 for re-circulating the circulating air 36 represents a potential source of failure, which has lasting effects on the fail safety of the system and must be compensated through sufficient redundancies with a corresponding weight disadvantage. Moreover, a mixing chamber 32 is necessary in order to mix the fresh air which is delivered by the air conditioning system 20 with the re-circulated circulating air 36.

C) Ventilation/Cooling Air System

Figure 4:
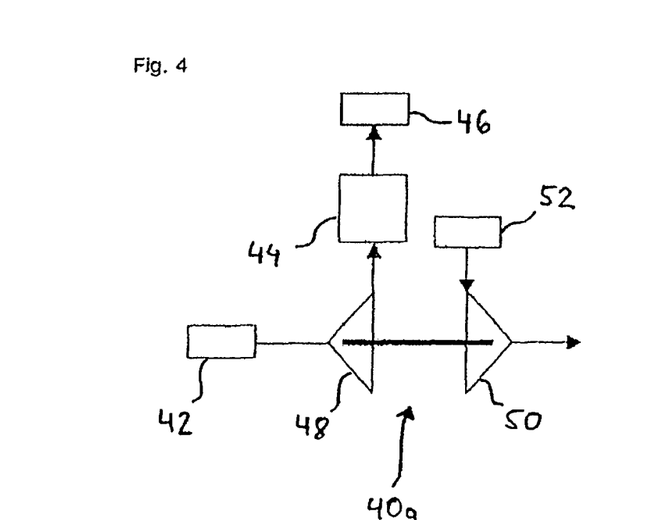
FIG. 4 represents a first variant of a conventional cooling air system.

As already mentioned above, the installation space of the air conditioning system must be ventilated in order to remove any escaping fuel and/or oil vapours and to exclude potential fires. A conventional system solution 40a, as represented in FIG. 4, provides a ventilation system in which the ventilation air is supplied from outside of the fuselage through a ram air inlet 42 in the vicinity of the air conditioning system. The ventilation of the installation space 44 of the air conditioning system during ground operation of the aircraft is secured by a compressor 48. The compressor 48 obtains its drive energy from the high-pressure bleed air system 52 which drives a turbine 50. Exhaust air is channelled via an outlet opening 46. The compressor 48 must not be operated during flight on account of the damming effect of the cooling air at the ram air inlet 42.

The ventilation system which is represented in FIG. 4 requires a ram air inlet 42 which is provided separately from the other systems and which in turn has a lasting influence on the drag coefficient of the aircraft. The compressor 48, which is necessary in this system, for ground operation, when no ram air is available, with air instead being sucked in from outside by means of the compressor 48 through the ram air inlet 42, represents a possible source of failure in addition to the actuators and the ram air inlet flaps.

Figure 5:
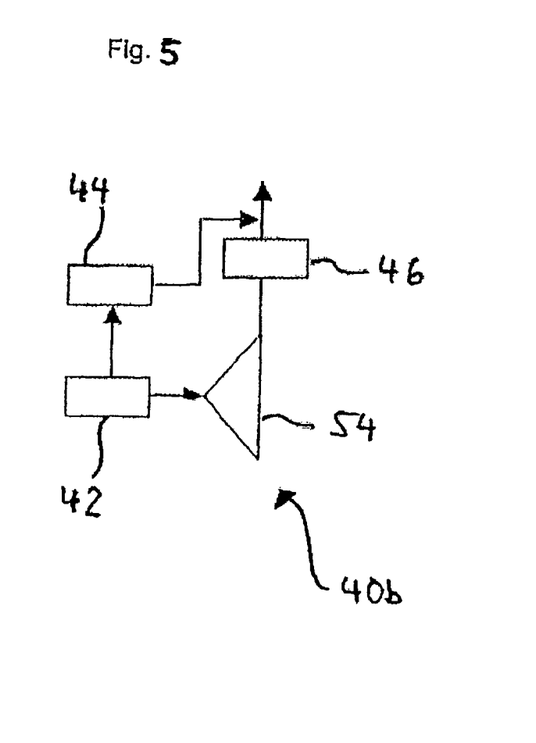
FIG. 5 represents a second variant of a conventional cooling air system.

Another concept 40b with regard to the cooling air supply for the air conditioning system and the ventilation of the installation space of the air conditioning system is represented in FIG. 5. According to this concept 40b, the ventilation air for the installation space of the air conditioning system 44 is withdrawn from the ram air inlet 42 of the cooling air blower 54. The ventilation air is removed on account of the flow conditions at the boundary layer of the fuselage, i.e. through negative pressure in the wake region of the cooling air outlet 46.

In the system which is represented in FIG. 5 the outlet geometry in the wake of the cooling air outlet 46 must be of a complex design in order to ensure that the ventilation air is sucked off. The flow conditions in the wake of the cooling air outlet, i.e. in the boundary layer of the fuselage, are neither predictable nor controllable. This circumstance therefore represents a further unsafety factor which leads to safety hazards in view of the possibility of fuel escaping or oil evaporating in the installation space of the air conditioning system.

DE 2 907 826 A describes an air circulating-cooling system for an aircraft in which, by means of an ejector mixing stage, fresh air withdrawn as bleed air is mixed with circulating air re-circulated from the passenger cabin. Mixing of the fresh air with the circulating air occurs downstream of a heat exchanger which is cooled through the use of ram air.

The air conditioning system described in DE 103 01 465 A1 includes at least two air conditioners, each of which is connected at its inlet with a supply line and its outlet with a cabin to be air-conditioned or a mixing chamber. The fresh air is withdrawn as bleed air from the turbine engines. Each of the air conditioners is driven through ram air for cooling the bleed air.

EP 1 695 910 A2 describes a system for generating inert gas. The system, for example, creates nitrogen gas for the cargo space or the fuel tank of the aircraft. To this end, compressed cabin air is pre-cooled, subsequently compressed again and directed to a main heat exchanger, before it reaches an air-disaggregation module which splits the cooled cabin air into inert gas and a permeate. The permeate is subsequently supplied to a ram air duct and discharged into the atmosphere. In order to increase the flow rate through the heat exchanger, ejectors are utilised which create at the outlet end of the heat exchanger a low pressure region.

U.S. Pat. No. 2,491,461 discloses a pressure generating system for an aircraft, in which, inter alia, circulated cabin air is mixed with compressed fresh air upstream of an air conditioner.

The object of the present invention is therefore to provide an air supply system for an aircraft, in particular for a passenger aircraft, with increased fail safety, in which the number of fail-unsafe components, such as, e.g. blowers and compressors, is minimised.

SUMMARY OF THE INVENTION

This object is achieved according to a first aspect of the invention by an air supply system of an aircraft, in particular of a passenger aircraft, which comprises a fresh air system, through which fresh air can be supplied to an aircraft cabin, a circulating air system, which is coupled to the fresh air system and through which used cabin air can be supplied to the fresh air system, a cooling air system for cooling an air conditioning system of the aircraft disposed in the fresh air system, and a ventilation system coupled to the cooling air system for ventilating an installation space of the air conditioning system, wherein a device for fluidically coupling the cooling air system and the ventilation system is disposed and configured inside the fuselage such that the air in one system can be driven through the air flow in the other system.

Because the air in one system is driven through and receives energy from the air flow in the other system, a fluidic coupling of two systems is accomplished. This relates to the coupling of the cooling air system to the ventilation system. The number of fail-unsafe mechanical structural elements, such as, for example blowers or compressors, which are necessary in the case of the conventional solution concepts, is at the same time minimised in the air supply system according to the invention. In contrast to the solution concept which is shown in FIG. 5, two systems are fluidically coupled on board the aircraft, so that the coupling is independent of the flow conditions in the boundary layer of the fuselage. There is therefore no need for a complex flow geometry at the cooling air outlet in order to remove the ventilation air together with the cooling air from the air supply system.

The fluidic coupling is preferably disposed and composed on board the aircraft such that the air in one system can be driven through a suction effect brought about by the air flow in the other system.

As a result of the suction effect caused by the air flow in one system, the air in the other system can be moved, which results in the two air flows being mixed in the region of the fluidic coupling. The suction effect caused by the air flow can be influenced by an appropriate choice of flow cross section. The suction effect and therefore the mixing rate at which the air from one system is mixed with the air flow in the other system can as a result be varied without any fail-unsafe mechanical components.

In one preferred configuration of the invention a first ejector mixing stage brings about the fluidic coupling of the cooling air system and the ventilation system. Ejector mixing stages of this kind represent fail-safe components, as they do not contain any mobile or rotating structural elements which can have a lasting influence on the reliability of the system.

According to a further preferred embodiment of the invention, the circulating air system and the fresh air system are fluidically coupled together through a second ejector mixing stage. The re-circulated circulating air in the circulating air system can therefore be sucked in and mixed through the fresh air flow in the fresh air system with the aid of the second ejector mixing stage. There is therefore no need for a blower in the circulating air system which delivers the circulating air into the fresh air system. Moreover, there is no need to provide a separate mixing chamber for mixing the fresh air with the circulating air.

The second ejector mixing stage is preferably disposed in the fresh air system upstream of the air conditioning system. In the system which is shown in FIG. 3 the exhaust air of the air conditioning system must be at a low temperature such that the elevated mixed air temperature caused by the blower in the circulating air system can be compensated. This can give rise to icing problems at the outlet of the air conditioning system. Furthermore, in the system which is shown in FIG. 3 the temperature of the mixed air and therefore the cabin temperature can only be set with the aid of a separate, permanently controlled adjustment system. These problems are prevented in the air supply system of the invention by mixing the fresh air with the circulating air upstream of the air conditioning system through the ejector mixing stage.

According to one preferred embodiment of the invention, a plurality of second ejector mixing stages are disposed parallel to one another in the fresh air system, with each of the plurality of second ejector mixing stages being coupled to a circulating air line of the circulating air system. By means of the plurality of ejector mixing stages disposed parallel to one another in the fresh air system, a larger quantity of fresh air can be mixed with a larger quantity of circulating air at different locations inside the fuselage, which increases the efficiency of the circulating air feed.

The fresh air system is preferably fluidically coupled through two bleed air lines to a secondary air stream circuit of two or more turbine engines of the aircraft. The fresh air is therefore withdrawn as bleed air from the secondary air stream circuit of the turbine engines of the aircraft, which renders a separate ram air inlet flap for providing the fresh air unnecessary. This has an advantageous effect on the drag coefficient of the aircraft.

According to a further configuration of the invention, the two bleed air lines lead into a fresh air line in the fuselage of the aircraft. A sufficient quantity of fresh air is as a result available even if one turbine engine fails.

According to a preferred embodiment of the invention, a fresh air blower is disposed in the fresh air line upstream of the second ejector mixing stage. This fresh air blower is only used during ground operation of the aircraft in order to suck in fresh air through the bleed air lines and to supply fresh air through the fresh air line to the first ejector mixing stage. A sufficient fresh air supply is therefore guaranteed even when the main turbine engines are not running.

At least one cabin air compressor which supplies compressed mixed air to the air conditioning system is preferably disposed upstream of the air conditioning system. This cabin air compressor produces sufficiently compressed mixed air which is necessary for operating the air conditioning system. The functionality of the air conditioning system can as a result be guaranteed even with small quantities of mixed air, as the compressor can be set to a reduced quantity of mixed air.

According to a further configuration of the invention, the cooling air system and the ventilation system can receive air through a single ram air inlet flap. There is therefore no need for a second separate ram air inlet flap, which would have lasting effects on the drag coefficient of the aircraft.

According to a further preferred embodiment of the invention, a cooling air blower is disposed in the cooling air system downstream of the ram air inlet flap. During ground operation of the aircraft this cooling air blower sucks in cooling air through the ram air inlet flap with which the heat exchanger of the air conditioning system is cooled. Sufficient cooling of the heat exchanger can therefore also be guaranteed during ground operation of the aircraft.

The cooling air blower in the cooling air system and the fresh air blower in the fresh air system can preferably be driven by a common motor. As both blowers are driven by a common motor, this results in a further saving of weight.

According to a second aspect, the invention provides for a method for mixing two air streams in an air supply system of an aircraft, in particular of a passenger aircraft, wherein the air supply system comprises a fresh air system, through which fresh air is supplied to an aircraft cabin, a circulating air system, which is coupled to the fresh air system and through which used cabin air is supplied to the fresh air system, a cooling air system for cooling an air conditioning system of the aircraft disposed in the fresh air system, and a ventilation system coupled to the cooling air system for ventilating an installation space of the air conditioning system, and wherein a fluidic coupling of the cooling air system and the ventilation system is accomplished inside the fuselage such that the air in one system is driven through the air flow in the other system.

According to a preferred embodiment of the invention, the air flow in the cooling air system sucks in the air in the ventilation system.

The circulating air from the circulating air system is preferably sucked in through the fresh air flowing through the fresh air system and delivered into the fresh air system, so that the fresh air is mixed with the circulating air.

According to a further configuration of the invention, the mixed air is adjusted through the air conditioning system disposed in the fresh air system to a predetermined temperature and routed into the aircraft cabin.

According to a further preferred embodiment of the invention, the fresh air is withdrawn from a secondary circuit of the turbine engine of the aircraft while the aircraft is in flight. This bleed air is subsequently supplied to a second ejector mixing stage, in which the bleed air is mixed with the circulating air.

The cooling air flowing through the cooling air system preferably sucks in the ventilation air from the ventilation system and delivers the ventilation air into the cooling air system, so that the cooling air is mixed with the ventilation air.

According to a further preferred embodiment of the invention, the cooling air and the ventilation air are introduced through a ram air inlet flap into the cooling air system and the ventilation system.

In a further preferred embodiment of the invention the cooling air flows through a heat exchanger of the air conditioning system for cooling the mixed air which is to be supplied to the aircraft cabin, and the cooling air is subsequently supplied to a first ejector mixing stage, in which the cooling air is mixed with the ventilation air. Following this the cooling air mixed with the ventilation air is discharged through an air outlet in the fuselage.

BRIEF DESCRIPTION OF THE DRAWINGS

The invention is described in the following by way of example on the basis of a preferred embodiment with reference to the accompanying schematic drawings, in which:

FIG. 6 represents an air supply system according to an embodiment of the invention which comprises a fresh air, circulating air, cooling air and ventilation system.

DETAILED DESCRIPTION OF A PREFERRED EMBODIMENT

A preferred embodiment of an air supply system of an aircraft, in particular of a passenger aircraft, is represented in FIG. 6.

The air supply system comprises four sub-systems, which in each case perform different functions on board the aircraft. The air supply system comprises a fresh air system 110, which is responsible for supplying fresh air to the cabin compartment, a circulating air system, which removes used cabin air from the cabin compartment, with the used cabin air being re-circulated and supplied to the fresh air system following appropriate treatment. A further sub-system of the air supply system which is represented in FIG. 6 is represented by the cooling air system, which provides cooling air for the air conditioning system in order to moderate here the fresh air, which is still relatively warm, withdrawn as bleed air to a cabin temperature which is pleasant for the passengers. The air supply system also comprises a ventilation system which serves to ventilate the installation space of the air conditioning system. It is necessary to ventilate the installation space of the air conditioning system, as any fuel and/or oil vapours escaping from the air conditioning system must be removed in order to exclude potential fires.

At this point attention is drawn to the fact that there is no difference in substance Within the meaning of the invention between the term "inside the fuselage" and the term "on board the aircraft".

The term "air supply system" was selected for the arrangement which is represented in FIG. 5. However this term should not be interpreted in the narrower sense. The arrangement which is shown in FIG. 5 could equally be called an "air conditioning or ventilation system".

The fresh air system 110 of the air supply system 100 which is represented in FIG. 6 serves to supply fresh air to the aircraft cabin. For this purpose bleed air is withdrawn from the secondary circuits 112a, 112b of the main turbine engines. The bleed air off-takes 114a, 114b lead into a single fresh air line 116. This has the advantage that a sufficient fresh air supply into the fresh air system 110 is still guaranteed if a main turbine engine fails.

As no bleed air is available during ground operation of the aircraft, a fresh air blower 118 is disposed in the fresh air line 116. This fresh air blower 118 sucks in fresh air from outside of the aircraft during ground operation of the aircraft through the fresh air line 116 and the bleed air lines 114a, 114b. The fresh air blower 118 is driven via a motor 119. The fresh air line 116 leads to an ejector mixing stage 120. The fresh air line 116 continues from the ejector mixing stage 120 to a cabin air compressor 124, which is driven by means of a motor 126 and compresses the fresh air to an extent such that its flow energy is sufficient to guarantee the operation of the air conditioning system 130. An ozone converter 128 is disposed between the air conditioning system 130 and the cabin air compressor 124, this converter corresponding to a conventional catalyser and converting ozone into oxygen. The air conditioning system 130 comprises a heat exchanger 132, in which the air which is compressed by the compressor 124 and is still relatively warm at this point is moderated in temperature through the cooling air of the cooling air system 150 which is described in the following.

Used cabin air (recirculation air) 142 is re-circulated in a circulating air system 140 of the air supply system 100 and supplied through a circulating air line 144 to the ejector mixing stage 120. The ejector mixing stage 120 causes the circulating air 142 to be mixed with the fresh air flowing through the fresh air system 110. The flow energy of the fresh air is used in the ejector mixing stage 120 to suck the circulating air 142 out of the circulating air system 140 and into the fresh air line 116 connected to the ejector mixing stage 120. The fluidic coupling and mixing of the fresh air with the circulating air takes place solely through the flow energy of the fresh air. The flow energy is on the one hand determined by the pressure level of the bleed air which is withdrawn from the secondary circuits 112a, 112b of the main turbine engines. The flow energy of the fresh air can on the other hand also be influenced by the geometry of the fresh air line 116. The flow energy of the fresh air can be set through the fresh air blower 118 during ground operation, so that the suction effect which is exerted by the fresh air on the circulating air can be varied accordingly.

As the bleed air is withdrawn from the secondary circuits 112a, 112b of the main turbine engines and the pressure and temperature level of this bleed air is distinctly lower than that of bleed air which is withdrawn from the primary circuits of the main turbine engines, no further control valves or monitoring elements for high-temperature air lines are necessary, so that the number of structural elements necessary for a faultless mode of operation of the fresh air system 110 is reduced.

The air supply system 100 which is represented in FIG. 6 also comprises a cooling air system 150 for cooling the fresh air flowing through the heat exchanger 132 of the air conditioning system 130, and a ventilation system 170, which ventilates the installation space 190 of the air conditioning system.

The cooling air passes through a ram air inlet 152, which is usually located in the outer skin at the fuselage of the aircraft, into the cooling air line 154 of the cooling air system 150. A cooling air blower 156 is disposed in the cooling air system 150 downstream of the ram air inlet 152 for ground operation of the aircraft, which blower is driven by means of the same motor 119 which is already used for driving the fresh air blower 118 of the fresh air system 110. The cooling air blower 156 sucks in cold outside air through the ram air inlet 152 and delivers the outside air into the cooling air system 150. The cooling air flows through the heat exchanger 132 of the air conditioning system 130 downstream of the cooling air blower 156. As it flows through the heat exchanger 132 the fresh air flowing through the fresh air system 110 and the air conditioning system 130 is cooled to a predetermined temperature which guarantees the required comfort for the passengers in the aircraft cabin. The cooling air passes from the heat exchanger 132 into an ejector mixing stage 160 and from here through a cooling air outlet 162 into the atmosphere. The cooling air outlet 162 is disposed in the outer skin at the fuselage of the aircraft.

The ventilation air which is required to ventilate the installation space 190 of the air conditioning system 130 passes in the same way through the ram air inlet 152 into the ventilation system 170. The ventilation air 174 passes through a ventilation air line 171 into the installation space 190 of the air conditioning system 130 and upon leaving the installation space 190 is introduced into the ejector mixing stage 160. In order to prevent the ventilation air from coming into contact with the hot surfaces of the heat exchanger 132, the ventilation air is mixed with the cooling air downstream of the heat exchanger 132 in the ejector mixing stage 160. The cooling air mixed with the ventilation air is delivered through the cooling air outlet 162 into the atmosphere. A non-return valve 172 is disposed in the ventilation system 170 downstream of the ram air inlet 152, which valve serves to prevent a ventilation flow in the opposite direction.

The mode of operation of the ejector mixing stage 160 is at least similar to or the same as the mode of operation of the ejector mixing stage 120. The flow energy of the cooling air is used in the ejector mixing stage 160 to suck the ventilation air 174 out of the ventilation system 170, to mix it with this and to deliver it downstream through the cooling air outlet 162. The flow energy of the cooling air can be varied by appropriately selecting the geometry of the cooling air lines 154, 158 and appropriately setting the cooling air blower 156 during ground operation of the aircraft. The throughput of the ventilation air 174 through the installation space 190 of the air conditioning system 130 can thus be influenced by the flow energy of the cooling air.

The person skilled in the art is aware that the arrangement of an air supply system which is represented in FIG. 6 is not restricted to passenger aircrafts, but can equally be used in an aircraft of a general type.

The ejector mixing stages 120, 160 may also contain diaphragms, locks which prevent a backflow of the air from one system into the other system.

The arrangement which is represented in FIG. 6 and the inventive concept forming the basis of this can equally be applied to systems through which gases other than air flow.

The invention claimed is:

1. An air supply system of an aircraft, in particular of a passenger aircraft, comprising:
    a fresh air system, through which fresh air can be supplied to an aircraft cabin, the fresh air system including a fresh air blower,
    an aircraft air conditioning system, including a heat exchanger, disposed in an installation space of the air conditioning system,
    a circulating air system, which is coupled to the fresh air system and through which used cabin air can be supplied to the fresh air system,
    a cooling air system for cooling the air conditioning system, the cooling air system including a cooling air blower disposed upstream of and fluidically coupled to the heat exchanger such that cooling air supplied by the cooling air blower flows through the heat exchanger,
    a ventilation system for ventilating the installation space of the air conditioning system,
    a device for fluidically coupling the cooling air system and the ventilation system disposed downstream of the installation space such that the cooling air flowing through the heat exchanger also flows through the device, the device configured inside the fuselage such that a flow of ventilation air through the installation space is driven by a suction effect brought about by the cooling air flowing through the device, and
    a common motor configured to drive both the cooling air blower in the cooling air system and the fresh air blower in the fresh air system.

2. The air supply system according to claim 1, wherein a first ejector mixing stage brings about the fluidic coupling of the cooling air system and the ventilation system.

3. The air supply system according to claim 1, wherein the circulating air system and the fresh air system are fluidically coupled through a second ejector mixing stage.

4. The air supply system according to claim 3, wherein the second ejector mixing stage is disposed in the fresh air system upstream of the air conditioning system.

5. The air supply system according to claim 4, wherein a plurality of second ejector mixing stages are disposed parallel to one another in the fresh air system, and that each of the plurality of second ejector mixing stages is coupled to a circulating air line of the circulating air system.

6. The air supply system according to claim 1, wherein the fresh air system is fluidically coupled through two bleed air lines to a secondary air stream circuit of two or more turbine engines of the aircraft.

7. The air supply system according to claim 6, wherein the two bleed air lines lead into a fresh air line in the fuselage of the aircraft.

8. The air supply system according to claim 7, wherein the fresh air blower is disposed in the fresh air line upstream of the second ejector mixing stage, the fresh air blower sucks in fresh air through the bleed air lines and supplies fresh air through the fresh air line to the second ejector mixing stage during ground operation of the aircraft.

9. The air supply system according to claim 1, wherein at least one cabin air compressor which supplies compressed mixed air to the air conditioning system is disposed upstream of the air conditioning system.

10. The air supply system according to claim 1, wherein the cooling air system and the ventilation system can receive air through a single ram air inlet, and wherein a non-return valve is disposed in the ventilation system downstream of the ram air inlet.

11. The air supply system according to claim 10, wherein the cooling air blower is disposed in the cooling air system downstream of the ram air inlet, the cooling air blower sucks in cooling air through the ram air inlet and supplies it to the air conditioning system during ground operation of the aircraft.

12. A method for mixing two air streams in an air supply system of an aircraft, in particular of a passenger aircraft, wherein the air supply system comprises a fresh air system, through which fresh air is supplied to an aircraft cabin a fresh air blower, a circulating air system, which is coupled to the fresh air system and through which used cabin air is supplied to the fresh air system, a cooling air system for cooling an air conditioning system of the aircraft disposed in the fresh air system, and a ventilation system coupled to the cooling air system for ventilating an installation space of the air conditioning system,
    supplying a flow of cooling air with a cooling air blower in the cooling air system,
    directing the flow of cooling air through a heat exchanger of the air conditioning system,
    fluidically coupling the cooling air system and the ventilation system downstream of the installation space and inside the fuselage such that a flow of ventilation air flow through the installation space is driven by a suction effect brought about by the flow of cooling in the cooling air system downstream of the heat exchanger,
    and
    driving the cooling air blower in the cooling air system and the fresh air blower in the fresh air system with a common motor.

13. The method according to claim 12, wherein the fresh air flowing through the fresh air system sucks in the circulating air from the circulating air system and delivers it into the fresh air system, so that the fresh air is mixed with the circulating air.

14. The method according to claim 13, wherein the fresh air mixed with the circulating air is adjusted through the air conditioning system disposed in the fresh air system to a predetermined temperature, and the mixed air is subsequently supplied to the aircraft cabin.

15. The method according to claim 13, wherein the fresh air is bleed air from a secondary air stream circuit of one or more turbine engine(s) of the aircraft while the aircraft is in flight, and the bleed air is subsequently supplied to a second ejector mixing stage, in which the bleed air is mixed with the circulating air.

16. The method according to claim 15, wherein the fresh air is bleed air from a secondary air stream circuit of one or more turbine engine(s) of the aircraft while the aircraft is in flight, and the bleed air is subsequently supplied to a second ejector mixing stage, in which the bleed air is mixed with the circulating air.

17. The method according to claim 12, wherein the cooling air and the ventilation air are introduced through a single ram air inlet into the cooling air system and the ventilation system, and wherein a non-return valve is disposed in the ventilation system downstream of the ram air inlet.

18. The method according to claim 17, wherein the cooling air flows through the heat exchanger of the air conditioning system and is subsequently supplied to a first ejector mixing stage, in which the cooling air and the ventilation air are mixed before the cooling air mixed with the ventilation air is discharged through an air outlet in the fuselage.

* * * * *